US009189418B2

(12) United States Patent
Kondoh et al.

(10) Patent No.: US 9,189,418 B2
(45) Date of Patent: *Nov. 17, 2015

(54) COMPUTER SYSTEM, SERVER MODULE, AND STORAGE MODULE

(71) Applicant: HITACHI, LTD., Tokyo (JP)

(72) Inventors: Yuki Kondoh, Hino (JP); Isao Ohara, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,577

(22) Filed: Jan. 14, 2015

(65) Prior Publication Data

US 2015/0127872 A1    May 7, 2015

Related U.S. Application Data

(63) Continuation of application No. 14/453,729, filed on Aug. 7, 2014, now Pat. No. 8,959,302, which is a continuation of application No. 14/045,631, filed on Oct. 3, 2013, now Pat. No. 8,868,865.

(30) Foreign Application Priority Data

May 14, 2013  (JP) ................. 2013-101842

(51) Int. Cl.
*G06F 12/00* (2006.01)
*G06F 12/10* (2006.01)
(Continued)

(52) U.S. Cl.
CPC ............ *G06F 12/1081* (2013.01); *G06F 3/067* (2013.01); *G06F 3/0613* (2013.01); *G06F 3/0661* (2013.01); *G06F 13/28* (2013.01); *G06F 13/4282* (2013.01); *G06F 15/17331* (2013.01)

(58) Field of Classification Search
CPC . G06F 12/00; G06F 11/1451; G06F 11/1456; G06F 11/1464; G06F 11/1469; G06F 3/06; G06F 3/067
See application file for complete search history.

(56) References Cited

U.S. PATENT DOCUMENTS 7,337,331 B2    2/2008 Yoshida
7,631,117 B2   12/2009 Aida et al.
(Continued)

FOREIGN PATENT DOCUMENTS

JP    2006127300 A    5/2006
JP    2006309477 A   11/2006
(Continued)

OTHER PUBLICATIONS

Japanese Office Action received in Japanese Application No. 2013-101842, dated Sep. 9, 2014.
(Continued)

*Primary Examiner* — Midys Rojas
(74) *Attorney, Agent, or Firm* — Mattingly & Malur, PC

(57) ABSTRACT

An exemplary computer system includes a server module including a first processor and first memory, a storage module including a second processor, a second memory and a storage device, and a transfer module. The transfer module retrieves a first transfer list including an address of a first storage area, which is set on the first memory for a read command, from the server module. The transfer module retrieves a second transfer list including an address of a second storage area in the second memory, in which data corresponding to the read command read from the storage device is stored temporarily, from the storage module. The transfer module sends the data corresponding to the read command in the second storage area to the first storage area by controlling the data transfer between the second storage area and the first storage area based on the first and second transfer lists.

14 Claims, 9 Drawing Sheets

(51) Int. Cl.
*G06F 3/06* (2006.01)
*G06F 13/42* (2006.01)
*G06F 15/173* (2006.01)
*G06F 13/28* (2006.01)

(56) References Cited

U.S. PATENT DOCUMENTS

| | | |
|---|---|---|
| 7,966,471 B2 | 6/2011 | Katsuragi et al. |
| 8,554,963 B1 | 10/2013 | Shapiro et al. |
| 2006/0095611 A1 | 5/2006 | Winchester et al. |
| 2006/0265449 A1 | 11/2006 | Uemura et al. |
| 2008/0140904 A1 | 6/2008 | Jeddeloh |
| 2009/0248910 A1 | 10/2009 | Conroy et al. |
| 2010/0082919 A1 | 4/2010 | Chen et al. |
| 2011/0185032 A1 | 7/2011 | Hiramoto et al. |
| 2012/0036286 A1 | 2/2012 | Torigoe et al. |
| 2012/0136977 A1 | 5/2012 | Factor et al. |
| 2013/0268694 A1 | 10/2013 | Campbell et al. |

FOREIGN PATENT DOCUMENTS

| | | |
|---|---|---|
| JP | 2009129201 A | 6/2009 |
| JP | 2012118973 A | 6/2012 |
| WO | 2011161722 A1 | 12/2011 |

OTHER PUBLICATIONS

Extended European Search Report received in corresponding European Application No. 14163093.9 dated Mar. 31, 2015.
Keith Holt, End-to-End Data Protection Justification, Internet Citation, Jul. 1, 2003, p. 1-7.

COMPUTER SYSTEM, SERVER MODULE, AND STORAGE MODULE

CLAIM OF PRIORITY

This is a continuation application of U.S. Ser. No. 14/453,729, filed Aug. 7, 2014 which is a continuation of Ser. No. 14/045,631, filed Oct. 3, 2013 (now U.S. Pat. No. 8,868,865), which claims priority from Japanese patent application JP2013-101842 filed on May 14, 2013, the contents of the above applications are hereby incorporated by reference into this application.

BACKGROUND

This invention relates to a computer system, a server module, and a storage module for performing high-speed data transfer between the server module and the storage module.

Computer systems in which a server is connected with a storage apparatus to be accessed by the server include the following known systems.

One of such known computer systems is a computer system in which a server is connected with a storage apparatus via a network such as a SAN (for example, refer to JP 2012-118973 A).

JP 2012-118973 A discloses a storage appliance system comprising at least one application server for locally executing an application and one or more storage servers in communication with said at least one application server for I/O transmission therebetween.

This computer system is to be used for a large-scale computer system. This computer system has an advantage of high flexibility in system configuration but has a disadvantage of high cost for installing and operating apparatuses forming a network such as a SAN.

Another known computer system is a computer system in which multiple servers are connected with a storage apparatus via a disk interface (for example, refer to JP 2006-309477 A).

JP 2006-309477 A discloses a system of a blade server apparatus comprising one or more server modules, one or more storage modules, and a management module for managing the whole apparatus, which are installed in slots to form the blade server apparatus using a backplane for enabling signal transmission among the modules, wherein the server modules and the storage modules are interconnected via a disk interface on the backplane; each server module and storage module has a module management unit for controlling the power in the module; and the module management unit controls the power in the server module or the storage module according to a power control signal sent from the management module.

This computer system is to be used for a small-scale computer system. This computer system can provide dense servers but has a problem of low system flexibility.

In recent years, computer systems that include servers and a storage apparatus within a chassis are increasingly employed. Such a computer system can show flexible and excellent performance at a low cost. The servers and the storage apparatus are connected to one another via a backplane within the same chassis.

SUMMARY

The servers and the storage apparatus can communicate at high speed because of the connection via the backplane. However, the formats of commands handled by the servers and the storage apparatus are different and moreover, the formats of data are different. Accordingly, the servers and the storage apparatus need to convert the command format and the data format.

Since this conversion generates overhead in the servers and the storage apparatus, it is difficult to attain high-speed data transfer or to increase the throughput to the performance limit.

Furthermore, existing technology does not provide a module that enables high-speed data transfer between the memory of a server and the memory of a storage apparatus.

The invention has been accomplished in view of the foregoing problems. In other words, an object of this invention is to achieve high-speed data transfer between a server and a storage apparatus.

An aspect of the invention is a computer system including a server module including a first processor and first memory, a storage module including a second processor, a second memory and a storage device, and a transfer module being coupled to the server module and the storage module, controlling a data transfer between the server module and the storage module. When the first processor of the server issues a read command to the second processor of the storage module via the transfer module, the transfer module retrieves a first transfer list including an address of a first storage area, which is set on the first memory by the first processor for the read command, from the server module. The transfer module further retrieves a second transfer list including an address of a second storage area in the second memory, in which data corresponding to the read command read from the storage device is stored temporarily by the second processor, from the storage module. The transfer module sends the data corresponding to the read command in the second storage area to the first storage area by controlling the data transfer between the second storage area and the first storage area based on the first transfer list and the second transfer list. The transfer module sends a notice of a completion of the data transfer to the second processor. The second processor is configured to send a notice of a completion of the read command in response to receiving the notice of the completion of the data transfer.

The invention provides a transfer module for performing high-speed data transfer via neither the processor of a server module nor the processor of a storage module.

Problems, configurations, and effects of this invention other than those described above are clarified through the description of embodiments hereinafter.

DETAILED DESCRIPTION OF THE EMBODIMENTS

Hereinafter, embodiments of this invention are described in detail with reference to the accompanying drawings.

Embodiment 1

Figure 1:
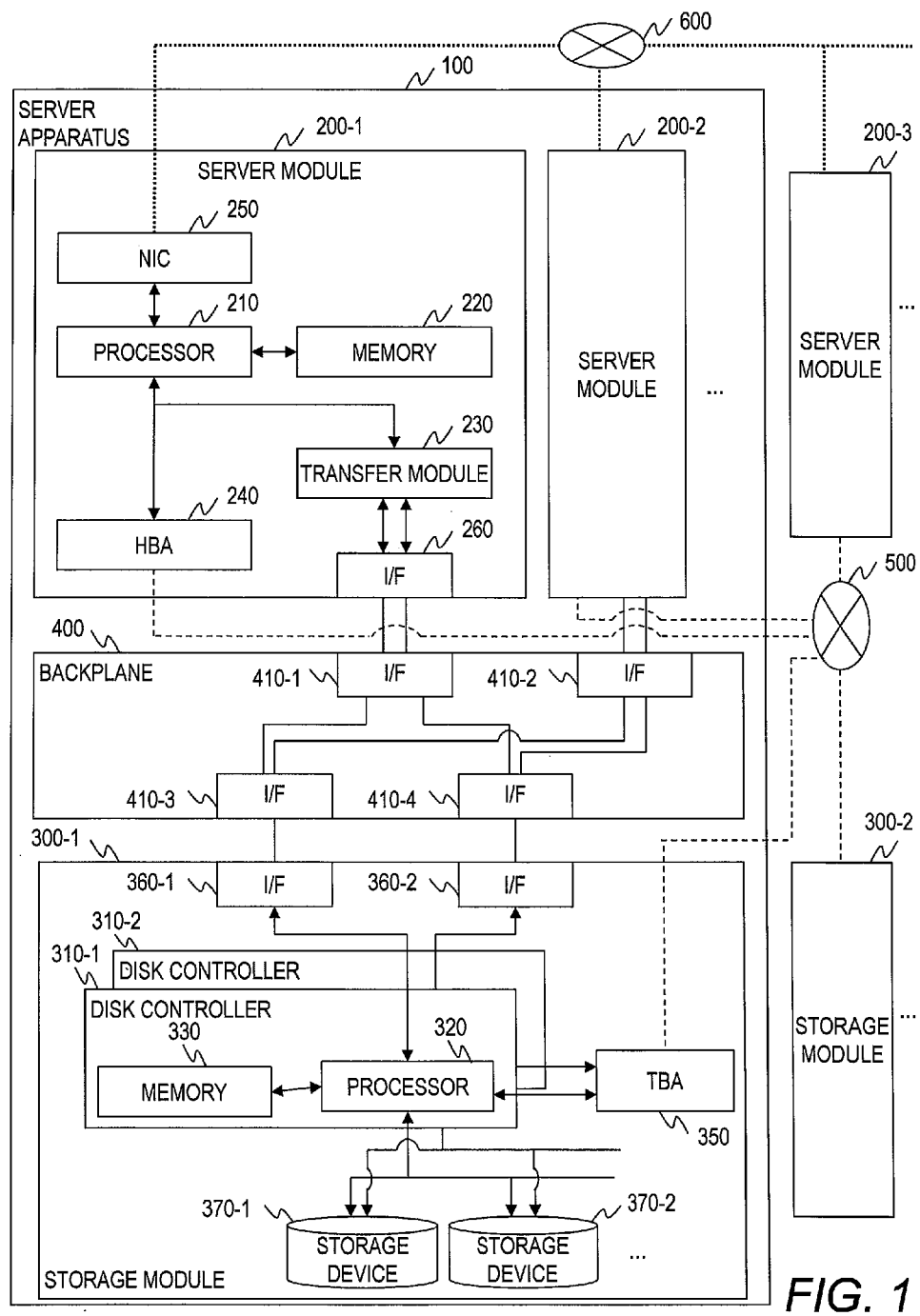
FIG. 1 is a block diagram illustrating a configuration example of a computer system in Embodiment 1 of this invention.

FIG. 1 is a block diagram illustrating a configuration example of a computer system in Embodiment 1 of this invention.

The computer system in Embodiment 1 is composed of a server apparatus 100, server modules 200, and storage modules 300.

The server apparatus 100 includes a plurality of server modules 200, a storage module 300, and a backplane 400. In the example shown in FIG. 1, the server apparatus 100 includes a server module 200-1, a server module 200-2, and a storage module 300-1.

The server modules 200 are computers for executing predetermined service. The storage module 300 is a computer for storing data to be used by the server modules 200. In this embodiment, the storage module 300 provides LUs (Logical Units) to the server modules 200.

Each server module 200 includes a processor 210, a memory 220, a transfer module 230, an HBA 240, a NIC 250, and an I/F 260. The components of the server module 200 are connected with one another via an I/O bus. The I/O bus includes the PCI bus, the PCIe bus, the system bus, and the like. This invention is not limited to the type of the I/O bus connecting the components.

The processor 210 executes programs stored in the memory 220. The processor 210 executes a program stored in the memory 220 to perform a function of the server module 200.

The memory 220 stores programs to be executed by the processor 210 and information required to execute the programs. The programs and information to be stored in the memory 220 will be described later with FIG. 2.

The programs and information to be stored in the memory 220 may be stored in an LU provided by the storage module 300 or other area. In this case, the processor 210 acquires a program and information from the storage area of the LU or other area holding the program to load the acquired program and information to the memory 220.

The transfer module 230 controls data transfer between the server module 200 and the storage module 300. The detailed configuration of the transfer module 230 will be described later with FIG. 4.

The HBA 240 is an interface for connecting the server module 200 to an external apparatus via a network such as a SAN (Storage Area Network). The NIC 250 is an interface for connecting the server module 200 to an external apparatus via a network such as a LAN (Local Area Network). The I/F 260 is a connector for connecting the server module 200 to the backplane 400.

The transfer module 230 may be mounted on a board of the server module 200 as a chip (LSI) or mounted on an adapter such as the HBA or NIC. However, this invention is not limited to the way to mount the transfer module 230.

Each storage module 300 includes disk controllers 310, a TBA (Target Bus Adapter) 350, I/Fs 360, and storage devices 370. The components included in the storage module 300 are connected with one another via an I/O bus. The I/O bus includes the PCI bus, the PCIe bus, the SAS (Serial Attached SCSI) interface, the system bus, and the like. However, this invention is not limited to the type of I/O bus connecting the components.

The disk controllers 310 manage storage areas and control association relations between the server modules 200 and the storage areas. Each disk controller 310 includes a processor 320 and a memory 330.

In this embodiment, the storage module 300-1 has two disk controllers: a disk controller 310-1 and a disk controller 310-2. This is because the redundant disk controllers enhance the fault tolerance.

The disk controller 310-1 is connected to the I/F 360-1 and the disk controller 310-2 is connected to the I/F 360-2. The disk controllers 310-1 and 310-2 are each connected to the TBA 350 and the storage devices 370.

The processor 320 executes programs stored in the memory 330. The processor 320 executes a program held in the memory 330 to perform a function of the storage module 300.

The memory 330 stores programs to be executed by the processor 320 and information required to execute the programs. The programs and information to be stored in the memory 330 will be described later with FIG. 3.

The programs and information to be stored in the memory 330 may be stored in a storage device 370 or other area. In this case, the processor 320 acquires a program and information from the storage device 370 or other area to load the acquired program and information to the memory 330.

The TBA 350 is an interface for connecting the storage module 300 to an external apparatus via a network such as a SAN. The I/Fs 360 are connectors for connecting the storage module 300 to the backplane 400.

Each storage device 370 is a device for storing data, which may be an HDD (Hard Disk Drive), an SSD (Solid State Drive), or the like.

In this embodiment, the storage module 300 configures a RAID using a plurality of storage devices and creates LUs from a RAID volume to provide the LUs to the server modules 200. Each LU stores programs such as an OS 221 (refer to FIG. 2) and an application 223 (refer to FIG. 2) and information required to execute the programs.

The backplane 400 connects the server modules 200 with the storage module 300. The backplane 400 has a plurality of I/Fs 410 for connecting the server modules 200 with the storage module 300. The backplane 400 also has an I/O bus for connecting the I/Fs 410.

Now, connections in the computer system are described.

The server module 200-1 and the backplane 400 in the server apparatus 100 are connected via two connection lines. The server module 200-1 is connected to the I/F 360-1 and the I/F 360-2 in the storage module 300 via these two connection lines.

The I/Fs 360 in the storage module 300 are configured to be connected to different disk controllers 310; the I/F 360-1 is connected to the disk controller 310-1 and the I/F 360-2 is connected to the disk controller 310-2. Accordingly, the server module 200-1 is connected to the two disk controllers 310-1 and 310-2 one to one.

In this embodiment, both of the two disk controllers 310-1 and 310-2 are active. Accordingly, the two disk controllers 310-1 and 310-2 independently perform I/O processing to raise the throughput. In the meanwhile, if a fault occurs in the disk controller 310-1, the disk controller 310-2 can continue the I/O processing. Consequently, the service can be kept being executed.

The server modules 200-1 and 200-2 in the server apparatus 100 are connected to an external server module 200-3 via a LAN 600 and connected to an external storage module 300-2 via a SAN 500.

The storage module 300-1 in the server apparatus 100 is connected to the external server modules 300-2 via the SAN 500.

Figure 2:
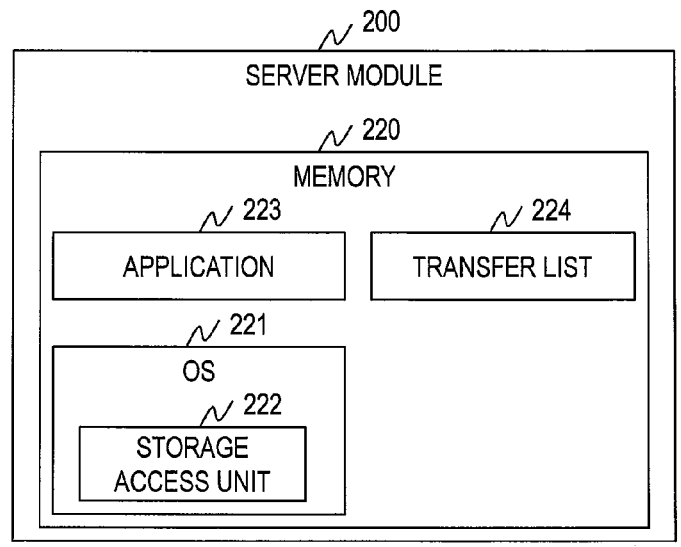
FIG. 2 is a block diagram illustrating a software configuration of a server module in Embodiment 1 of this invention.

FIG. 2 is a block diagram illustrating a software configuration of the server module 200 in Embodiment 1 of this invention.

The memory 220 stores programs to implement the OS 221 and an application 223. The memory 220 also stores a transfer list 224.

The OS 221 manages the server module 200. The OS 221 includes a storage access unit 222 for controlling accesses between the server module 200 and the storage module 300. The storage access unit 222 may be implemented using a device driver for operating the transfer module 230.

The OS 221 has functions including a not-shown file system but they are omitted since they are known in the art.

The application 223 executes predetermined service. This invention is not limited to the kind of the application.

The transfer list 224 is information to be used in data transfer between the memory 220 of the server module 200 and the memory 330 of the storage module 300 not via the processor 210. This embodiment employs an SGL (Scatter Gather List) used in DMA transfer as the transfer list 224.

The SGL includes addresses and address lengths. An address is a start address of a storage area in the memory 220 to store designated data. An address length is a value representing the address range corresponding to the storage area in the memory 220.

The transfer list 224 is information to be held in data transfer on a temporal basis.

Figure 3:
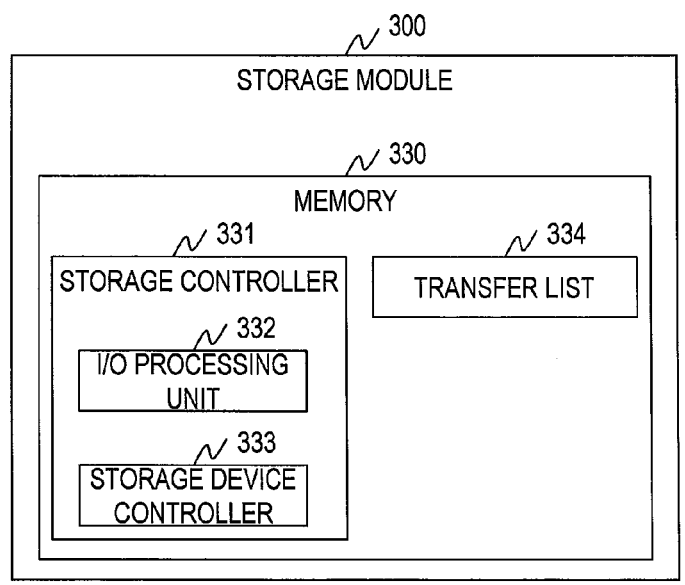
FIG. 3 is a block diagram illustrating a software configuration of a storage module in Embodiment 1 of this invention.

FIG. 3 is a block diagram illustrating a software configuration of the storage module 300 in Embodiment 1 of this invention.

FIG. 3 illustrates the memory 330 in the disk controller 310-1 by way of example. The memory 330 in the disk controller 310-2 has the same software configuration.

The memory 330 stores a program for implementing a storage controller 331. The memory 330 also stores the transfer list 334.

The storage controller 331 controls I/O processing between the server modules 200 and the storage module 300. The storage controller 331 includes an I/O processing unit 332 and a storage device controller 333.

The I/O processing unit 332 receives I/O requests from the server modules 200 and controls read processing or write processing based on the I/O request. The storage device controller 333 controls writing to and reading from the storage devices 370.

The I/O processing unit 332 can be implemented by a device driver for operating the transfer module 230. The storage device controller 333 can be implemented by a device driver for operating the storage devices 370.

The transfer list 334 is information to be used in data transfer between the memory 220 of a server module 200 and the memory 330 of the storage module 300 not via the processor 320. In this embodiment, an SGL used in DMA transfer is used as the transfer list 334.

The transfer list 334 is information stored in data transfer on a temporal basis.

Figure 4:
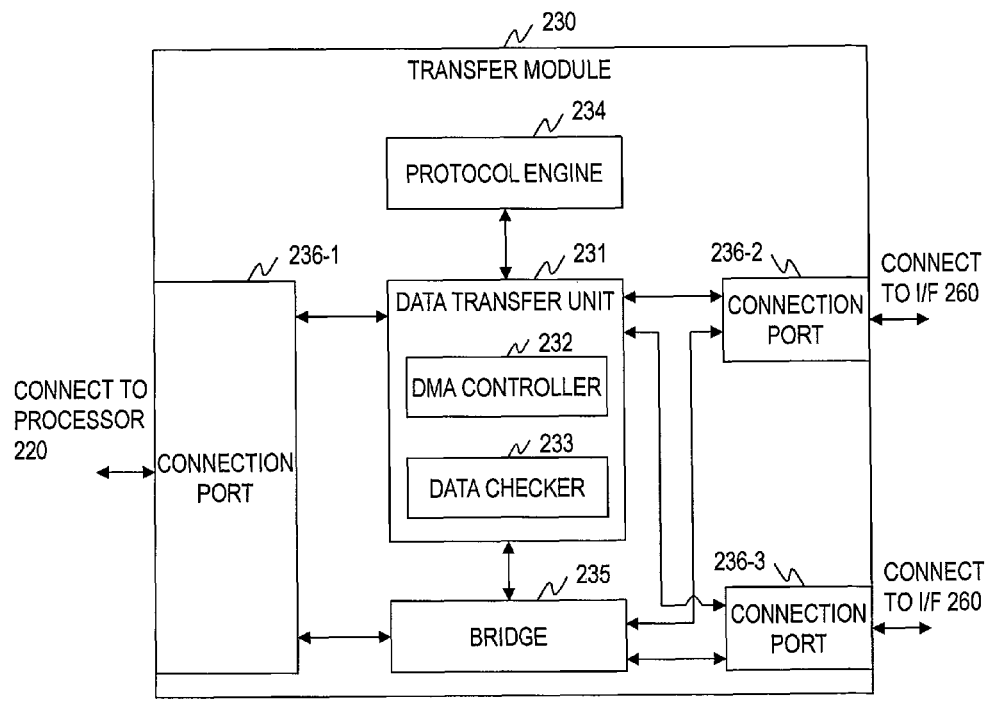
FIG. 4 is a block diagram illustrating a configuration example of a transfer module in Embodiment 1 of this invention.

FIG. 4 is a block diagram illustrating a configuration example of the transfer module 230 in Embodiment 1 of this invention.

The transfer module 230 includes a data transfer unit 231, a protocol engine 234, a bridge 235, and a plurality of connection ports 236.

The data transfer unit 231 controls data transfer between the memory 220 of the server module 200 and the memory 330 of the storage module 300. The data transfer unit 231 in this embodiment includes a DMA controller 232 and a data checker 233.

The DMA controller 232 controls DMA transfer between the memory 220 of the server module 200 and a memory 330 of the storage module 300. The data checker 233 attaches and removes data assurance codes. The data checker 233 also checks integrity of data based on the assurance codes. As the data assurance code, DIF (Data Integrity Field) may be used.

In a common computer system, the server module handles 512-byte data and the storage module handles 520-byte data, which is generated by attaching a data assurance code to the 512-byte data. It is assumed that the data handled by the server module 200 and the data handled by the storage module 300 in this embodiment are the same as those in the common computer system.

The protocol engine 234 converts a command used by the server module 200 to and from a command used by the storage module 300.

The bridge 235 controls communication between devices connected via the connection ports. For example, the bridge 235 converts a signal into a signal different in the number of lanes. The bridge 235 is used when the aforementioned DMA transfer is unnecessary.

The connection ports 236 are ports for connecting to other devices. In this embodiment, the connection port 236-1 is connected to the processor 210; the connection ports 236-2 and 236-3 are connected to the I/F 260. For example, in the case where the I/O bus connecting the devices is a PCIe bus, PCIe ports are used as the connection ports 236.

Figure 5:
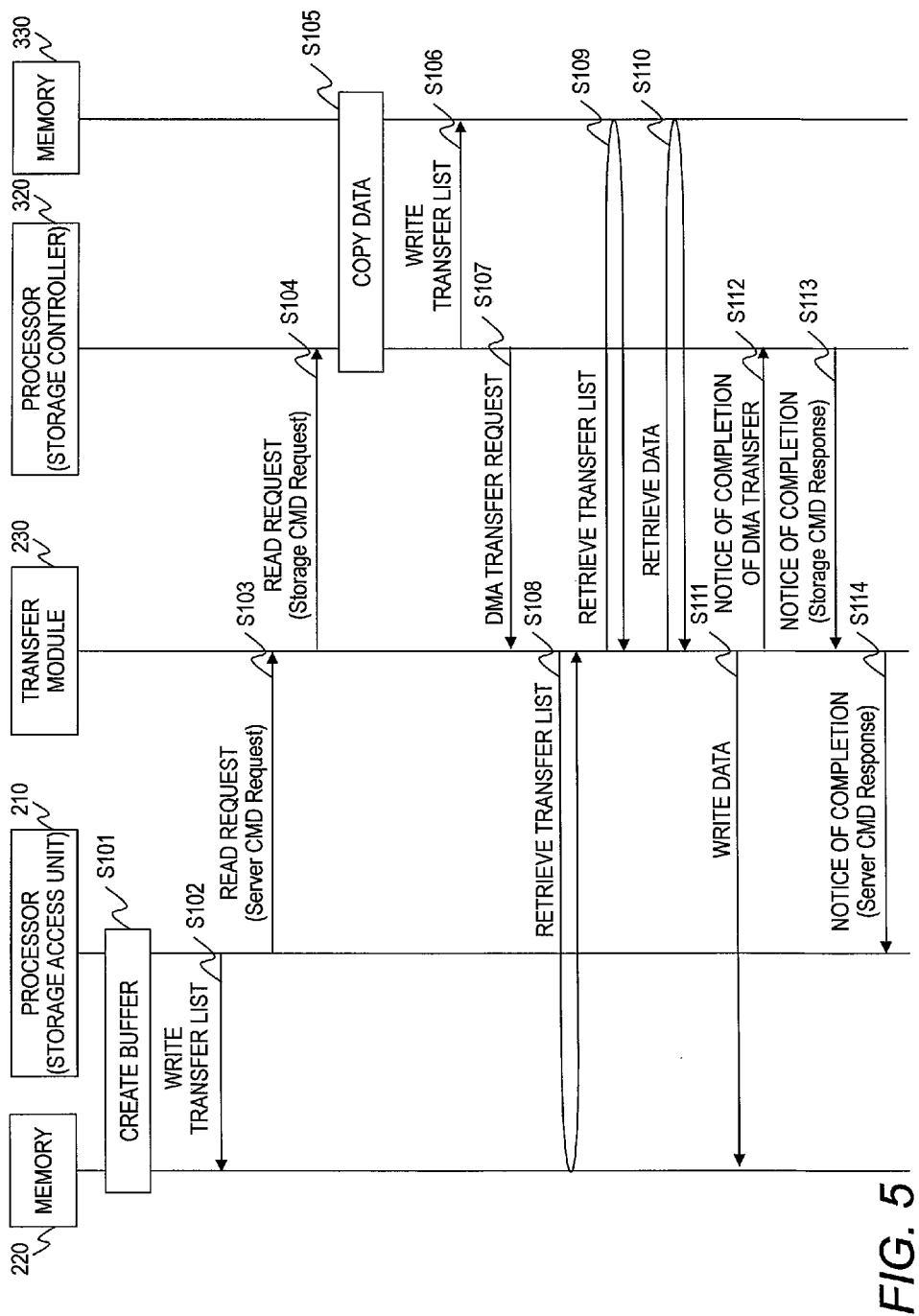
FIG. 5 is a sequence diagram illustrating an example of data transfer in Embodiment 1 of this invention.
Figure 6:
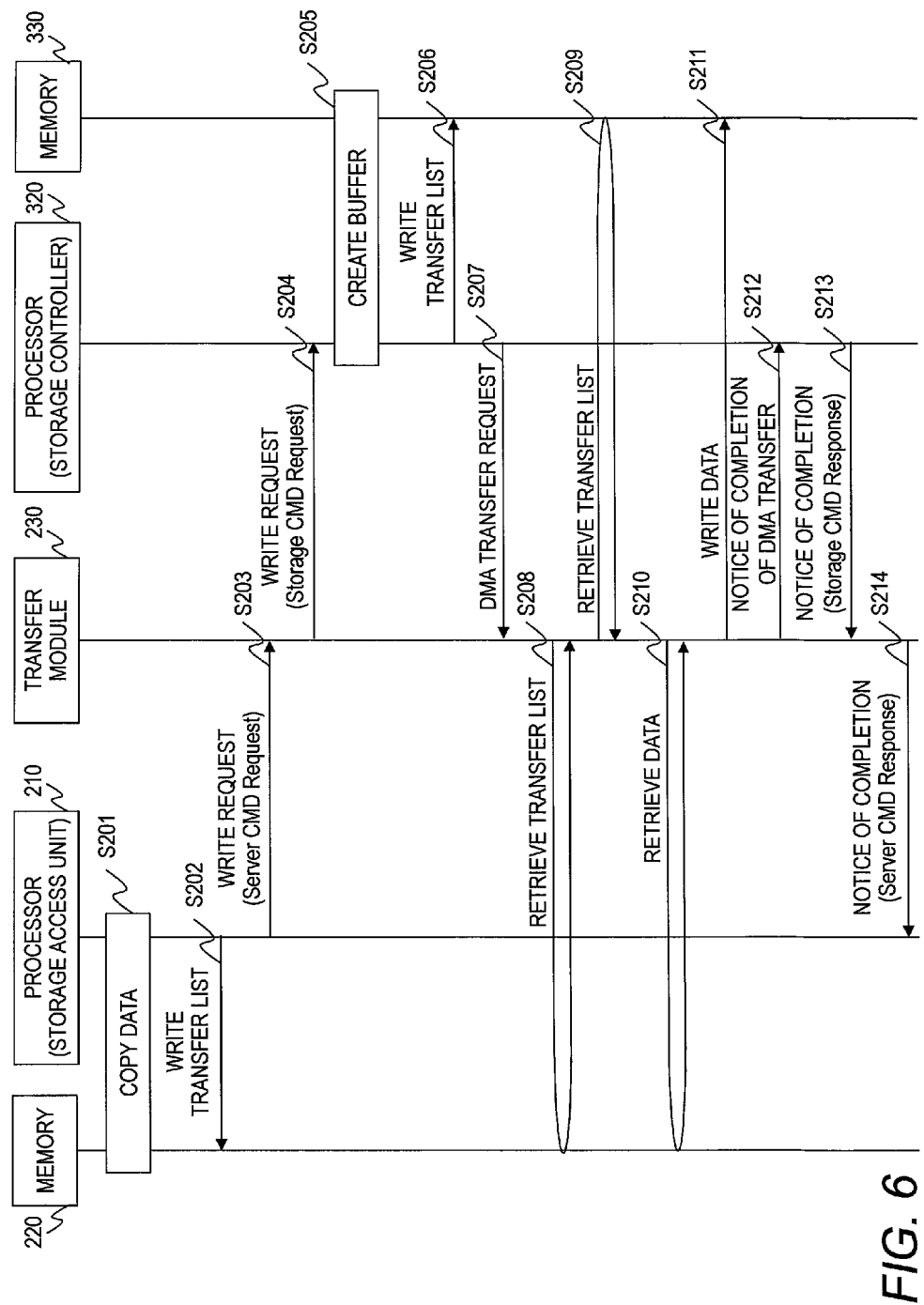
FIG. 6 is a sequence diagram illustrating an example of data transfer in Embodiment 1 of this invention.

FIGS. 5 and 6 are sequence diagrams illustrating examples of data transfer in Embodiment 1 of this invention.

FIG. 5 illustrates a processing flow of reading performed when the server module 200 retrieves data from the storage module 300. FIG. 6 illustrates a processing flow of writing performed when the server module 200 writes data to the storage module 300. The following description explains the case where an I/O request is issued to the disk controller 310-1 of the storage module 300 by way of example.

First, reading data is explained.

When the OS 221 receives a request to read data stored in the storage module 300 from the application 223, it invokes the storage access unit 222.

The storage access unit 222 prepares a buffer for temporarily storing the data to be read in the memory 220 (Step S101). The storage access unit 222 creates a transfer list 224 and writes the created transfer list 224 to the memory 220 (Step S102). The transfer list 224 includes the addresses, the address lengths, and other information to store the data retrieved from the storage module 300 to the buffer.

The storage access unit 222 further sends a read request to the storage controller 331 of the disk controller 310-1 (Step S103). This read request is a command used in the server module 200. Accordingly, this command is in a format different from the one used in the storage module 300. In other words, the server module 200 and the storage module 300 use different protocols.

In the following description, the command used by the server module 200 is referred to as server command and the command used by the storage module 300 is referred to as storage command.

When the transfer module 230 receives a read request (server command) from the storage access unit 222, it converts the read request to a storage command to send the converted read request (storage command) to the storage controller 331 (Step S104). Specifically, the following processing is performed.

The data transfer unit 231 analyzes the received read request (server command). Since the received read request (server command) is a server command to be sent to the storage module 300, the data transfer unit 231 instructs the protocol engine 234 to convert the command.

The protocol engine 234 converts the received read request (server command) from the server command to the storage command and outputs the converted read request (storage command) to the data transfer unit 231.

The data transfer unit 231 sends the input read request (storage command) to the storage controller 331 of the storage module 300.

Described above is the explanation of the processing at Step S104.

Upon receipt of the read request (storage command), the storage controller 331 retrieves the data to be read from the storage device 370 and copies the retrieved data to the memory 330 (Step S105). Specifically, the following processing is performed.

The I/O processing unit 332 issues a read request for the storage device 370 based on the read request (storage command) and invokes the storage device controller 333.

The invoked storage device controller 333 retrieves the designated data from the storage device 370 in accordance with the issued read request to output the data to the I/O processing unit 332.

The I/O processing unit 332 copies the input data to the memory 330.

Since the read request (storage command) has already been converted to a storage command by the transfer module 230 in this embodiment, the I/O processing unit 332 does not have to convert the command.

Described above is the explanation of the processing at Step S105.

The storage controller 331 creates a transfer list 334 and writes the created transfer list 334 to the memory 330 (Step S106). The transfer list 334 includes the addresses, the address lengths, and other information to retrieve the data copied to the memory 330.

Next, the storage controller 331 sends a DMA transfer request to the transfer module 230 (Step S107).

Upon receipt of the DMA transfer request, the transfer module 230 retrieves the transfer list 224 from the memory 220 of the server module 200 (Step S108) and retrieves the transfer list 334 from the memory 330 of the storage module 300 (Step S109).

Specifically, the DMA controller 232 in the data transfer unit 231 acquires the address to access the transfer list 224 held in the memory 220 of the server module 200 and the address to access the transfer list 334 held in the memory 330 of the storage module 300. It should be noted that the DMA controller 232 may acquire the transfer lists 224 and 334 themselves. The DMA controller 232 temporarily holds the acquired addresses or the transfer lists 224 and 334.

In the following description, the address to access the transfer list 224 held in the memory 220 of the server module 200 may be referred to as first address and the address to access the transfer list 334 held in the memory 330 of the storage module 300 may be referred to as second address.

The transfer module 230 refers to the transfer list 334 held in the memory 330 of the storage module 300 to retrieve the data copied to the memory 330 (Step S110).

Specifically, the DMA controller 232 in the data transfer unit 231 refers to the transfer list 334 held in the memory 330 of the storage module 300 with the second address to retrieve the data copied to the memory 330. The DMA controller 232 is to retrieve data on a predetermined data size basis. For example, the DMA controller 232 retrieves data in blocks of 520 bytes.

Next, the transfer module 230 writes the retrieved data to the memory 220 of the server module 200 (Step S111). Specifically, the following processing is performed.

The data checker 233 in the data transfer unit 231 converts the retrieved data into the data format for the server module 200. For example, the data checker 233 removes the data assurance code attached to the retrieved data. Through this operation, the data is converted into 512-byte data to be handled by the server module 200.

The data transfer unit 231 refers to the transfer list 224 held in the memory 220 of the server module 200 with the first address and refers to the transfer list 334 held in the memory 330 of the storage module 300 with the second address.

The data transfer unit 231 determines the storage area of the memory 220 to write the converted data based on the transfer lists 224 and 334. Then, the DMA controller 232 in the data transfer unit 231 writes the converted data to the determined storage area in the memory 220.

For example, to determine the storage area in the memory 220, the data transfer unit 231 adjusts the alignment. This is because the address of the storage area should be adjusted between the memories 220 and 330 in view of the difference in address length of data handled between the server module 200 and the storage module 300.

The data transfer unit 231 repeats the foregoing processing until all the data to be read has been retrieved.

The data transfer unit 231 may check the integrity of the retrieved data based on the data assurance code. Upon detection of some error in the retrieved data, the data transfer unit 231 may retrieve the data from the memory 330 of the storage module 300 again or notify the storage controller 331 of the detection of data error.

Described above is the explanation of the processing of Step S111.

Next, after writing all the data to be read to the memory 220, the transfer module 230 sends a notice of completion of DMA transfer to the storage controller 331 (Step S112).

Upon receipt of the notice of completion of DMA transfer, the storage controller 331 sends a notice of completion (storage command) for the OS 221 (Step S113).

Upon receipt of the notice of completion (storage command), the transfer module 230 converts the notice of completion (storage command) from the storage command to the server command and sends the converted notice of completion (server command) to the OS 221 (Step S114). Since the conversion of the command is similar to Step S104, the explanation is omitted.

In the case where the transfer lists 224 and 334 themselves are retrieved at Steps S108 and S109, the transfer module 230 refers to the transfer lists 224 and 334 and adjusts the alignment to create a conversion list for data storage. In this case, the data transfer unit 231 determines the storage area of the memory 220 to write the converted data based on the conversion list. The DMA controller 232 then writes the converted data to the determined storage area in the memory 220.

For example, the conversion list could be a list which associates the addresses in the transfer list 224 with the addresses in the transfer list 334.

The creation of the conversion list, as described above, needs to take the alignment into account. This is because the data unit size handled by the server module 200 is different from the data unit size handled by the storage module 300. Further, other causes are the effects from the deletion of the assurance codes by the data checker 233, the virtual storage management by the OS 221 acting in the server module 200 and the memory management by the storage controller 331 acting in the storage module 300.

For example, when reading 8192 bytes data from the server module 300, assurance codes are attached to the data and the data size is 8320 bytes in the storage module 300. The DMA transfer on the PCIe bus transfers data in power-of-two bytes blocks. Thus, the conversion list is created so as to carry out transfers two times for 8192 bytes data and 128 bytes data.

On the other hand, when the transfer list in the server module 200 designates noncontiguous two 4096 bytes areas for reading 8192 bytes, the conversion list is created so as to carry out transfers four times for 4096 bytes data, 64 bytes data, 4096 bytes data, 64 bytes data.

Figure 9:
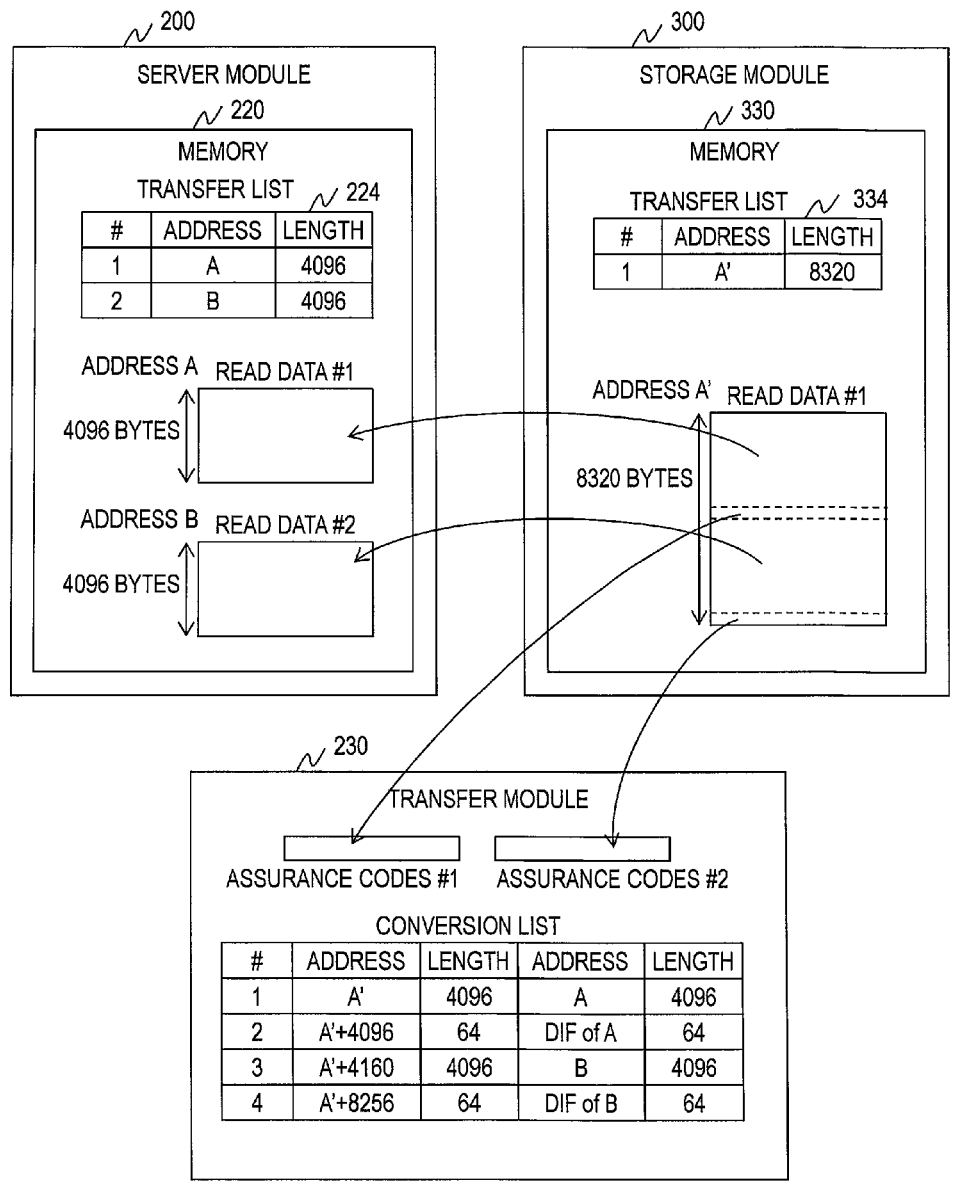
FIG. 9 illustrates an example in which the transfer module controls transfer of 8192 bytes data to be read for a read request from the memory of the storage module to the memory of the server module in Embodiment 1 of this invention.

Referring to FIG. 9, an example case will be described in which the transfer module 230 controls transfer of 8192 bytes data to be read for a read request from the memory 330 of the storage module 300 to the memory 220 of the server module 200.

The transfer module 230 acquires the transfer list 224 from the server module 200. As described above, the transfer list 224 indicates the start address and the data length of each of areas prepared on the memory 220 by the server module 200 for storing temporarily data to be read for a read request. The transfer list 224 in FIG. 9 indicates that the 4096 bytes area starting from the address A and the 4096 bytes area starting from the address B are prepared on the memory 220 for storing temporarily 8192 bytes read data. The transfer module 230 acquires the transfer list 334 from the storage module 300. As described above, the storage module 300 copies (stores temporarily) data to be read in accordance with a read request from the storage device 370 to the memory 330 along with the corresponding assurance codes at Step S105. The transfer list 334 indicates the start address and the address length of each of areas prepared on the memory 330 of the storage module 300 and storing temporarily data to be read for a read request. The transfer list 334 in FIG. 9 indicates that the 8192 bytes read data for the read request and the assurance codes are stored in the 8320 bytes area starting from the address A'.

The transfer module 230 creates a conversion list based on the transfer list 224 and the transfer list 334. Specifically, the transfer module 230 identifies the addresses of the areas storing the assurance codes from the transfer list 334. The transfer module 230 associates the addresses of areas excluding the areas storing the assurance codes (namely, areas storing the read data for the read request on the memory 330) as the data transfer source addresses with the addresses on the memory 220 of the server module 200 designated for storing temporarily the read data in the transfer list 224 as the data transfer destination addresses. The conversion list in FIG. 9 associates the address of the 4096 bytes area starting from the address A' on the memory 330 as the data transfer source address with the 4096 bytes area starting from the address A on the memory 220 as the data transfer destination address. Further, the conversion list in FIG. 9 associates the address of the 4096 bytes area starting from the address A'+4160 bytes on the memory 330 as the data transfer source address with the 4096 bytes area starting from the address B on the memory 220 as the data transfer destination address.

The transfer module 230 controls the transfer of the data to be read for the read request from the memory 330 of the storage module 300 to the memory 220 of the server module 200 based on the created conversion list.

As described above, the conversion list allows the transfer module 230 to manage integrally the memory 220 and the memory 330. Therefore, the transfer module 230 is capable of controlling directly the data transfer between the memory 220 and the memory 330 without other processors. As the transfer module 230 controls directly the data transfer between the memory 220 and the memory 330 in this example, the overhead is inhibited and the high-speed data transfer between the memory 220 and the memory 330 is achieved in comparison with data transfer through plural processors (for example, the processor 320 of the storage module 300 and the processor 220 of the server module 200) or buffer memories of the processors in the data transfer.

Next, writing data is described.

When the OS 221 receives a request to write data to the storage module 300 from the application 223, it invokes the storage access unit 222.

The storage access unit 222 copies the data to be written to the memory 220 (Step S201). The storage access unit 222 creates a transfer list 224 and writes the created transfer list 224 to the memory 220 (Step S202). The transfer list 224 includes the addresses, the address lengths, and other information to retrieve the data copied to the memory 220.

The storage access unit 222 sends a write request (server command) for the storage controller 331 (Step S203).

When the transfer module 230 receives the write request (server command), it converts the write request (server command) from the server command into the storage command and sends the converted write request (storage command) to the storage controller 331 (Step S204). Specifically, the following processing is performed.

The data transfer unit 231 analyzes the received write request (server command). Since the received write request (server command) is a server command to be sent to the storage module 300, the data transfer unit 231 instructs the protocol engine 234 to convert the command.

The protocol engine 234 converts the received write request (server command) from the server command to the storage command and outputs the converted write request (storage command) to the data transfer unit 231.

The data transfer unit 231 sends the input write request (storage command) to the storage controller 331 of the storage module 300.

Described above is the explanation of the processing at Step S204.

Upon receipt of the write request (storage command), the storage controller 331 prepares a buffer for temporarily storing the data to be written (Step S205). The storage controller 331 further creates a transfer list 334 and writes the created transfer list 334 to the memory 330 (Step S206). The transfer list 334 includes the addresses, the address lengths, and other information to store the data to be written to the buffer.

Next, the storage controller 331 sends a DMA transfer request to the transfer module 230 (Step S207).

Upon receipt of the DMA transfer request, the transfer module 230 retrieves the transfer list 224 from the memory 220 of the server module 200 (Step S208) and retrieves the transfer list 334 from the memory 330 of the storage module 300 (Step S209).

Specifically, the DMA controller 232 in the data transfer unit 231 acquires the first address from the server module 200 and acquires the second address from the storage module 300. Alternatively, the DMA controller 232 may acquire the transfer lists 224 and 334 themselves. The DMA controller 232 temporarily holds the acquired addresses or the transfer lists 224 and 334.

The transfer module 230 refers to the transfer list 224 held in the memory 220 of the server module 200 to retrieve the data copied to the memory 220 (Step S210).

Specifically, the DMA controller 232 in the data transfer unit 231 refers to the transfer list 224 held in the memory 220 of the server module 200 with the first address to retrieve the data copied to the memory 220. The DMA controller 232 is to retrieve data on a predetermined data size basis. For example, the DMA controller 232 retrieves data in blocks of 512 bytes.

Next, the transfer module 230 writes the retrieved data to the memory 330 of the storage module 300 (Step S211). Specifically, the following processing is performed.

The data checker 233 in the data transfer unit 231 converts the retrieved data into the data format for the storage module 300. For example, the data checker 233 attaches a data assurance code to the retrieved data. Through this operation, the data is converted into 520-byte data to be handled by the storage module 300.

The data transfer unit 231 refers to the transfer list 224 held in the memory 220 of the server module 200 with the first address and refers to the transfer list 334 held in the memory 330 of the storage module 300 with the second address.

The data transfer unit 231 determines the storage area of the memory 330 to write the converted data based on the transfer lists 224 and 334. Furthermore, the DMA controller 232 in the data transfer unit 231 writes the converted data to the determined storage area in the memory 330.

For example, the data transfer unit 231 adjusts the alignment to determine the storage area in the memory 330.

The data transfer unit 231 repeats the foregoing processing until all the data to be written has been written.

Described above is the explanation of the processing of Step S211.

Next, after writing all the data to be written to the memory 330, the transfer module 230 sends a notice of completion of DMA transfer to the storage controller 331 (Step S212).

Upon receipt of the notice of completion of DMA transfer, the storage controller 331 sends a notice of completion (storage command) for the OS 221 (Step S213).

Upon receipt of the notice of completion (storage command), the transfer module 230 converts the notice of completion (storage command) from the storage command to a server command and sends the converted notice of completion (server command) to the OS 221 (Step S214). Since the conversion of the command is similar to Step S204, the explanation is omitted.

In the case where the transfer lists 224 and 334 themselves are retrieved at Steps S208 and S209, the transfer module 230 refers to the transfer lists 224 and 334 to create a conversion list to adjust the alignment for data storage. In this case, the data transfer unit 231 determines the storage area of the memory 330 to write the converted data based on the conversion list at Step S211. The DMA controller 232 then writes the converted data to the determined storage area in the memory 330.

For example, the conversion list could be a list which associates the addresses in the transfer list 224 with the addresses in the transfer list 334.

The creation of the conversion list needs to take the above described alignment into account. This is because the data unit size handled by the server module 200 is different from the data unit size handled by the storage module 300. Further, other causes are the effects from the addition of the assurance codes by the data checker 233, the virtual storage management by the OS 221 running in the server module 200 and the memory management by the storage controller 331 running in the storage module 300.

For example, when writing 8192 bytes data from the server module 300, assurance codes are attached to the data and the data area is 8320 bytes in the storage module 300. The DMA transfer on the PCIe bus transfers data in power-of-two bytes blocks. Thus, the conversion list is created so as to carry out transfers two times for 8192 bytes data and 128 bytes data.

On the other hand, when the transfer list in the server module 200 designates noncontiguous two 4096 bytes areas for writing 8192 bytes, the conversion list is created so as to carry out transfers four times for 4096 bytes data, 64 bytes data, 4096 bytes data, 64 bytes data.

Figure 10:
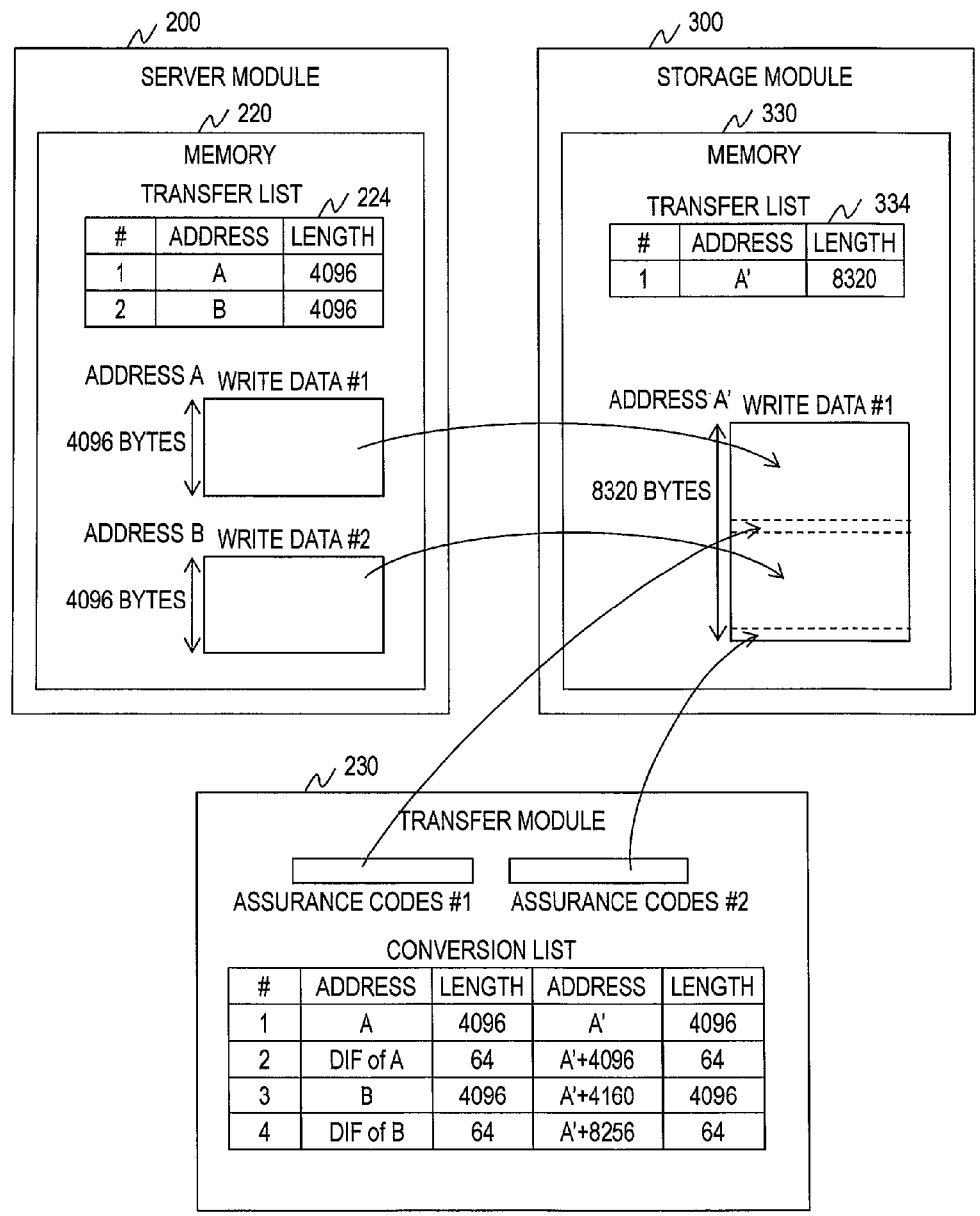
FIG. 10 illustrates an example in which the transfer module controls transfer of 8192 bytes data to be written for a write request from the memory of the server module to the memory of the storage module in Embodiment 1 of this invention.

Referring to FIG. 10, an example case will be described in which the transfer module 230 controls transfer of 8192 bytes data to be written for a write request from the memory 220 of the server module 200 to the memory 330 of the storage module 300.

The transfer module 230 acquires the transfer list 224 from the server module 200. As described above, the transfer list 224 indicates the start address and the data length of each of areas prepared on the memory 220 by the server module 200 and storing data to be written for a write request. The transfer list 224 in FIG. 10 indicates that the 8192 bytes write data are divided and stored in the 4096 bytes area starting from the address A and the 4096 bytes area starting from the address B. The transfer module 230 acquires the transfer list 334 from the storage module 300. The transfer list 334 indicates the start address and the address length of each of areas prepared on the memory 330 of the storage module 300 for storing temporarily data to be written for a write request. The transfer list 334 in FIG. 10 indicates that the 8192 bytes write data for the write request and the assurance codes are stored in the 8320 bytes area starting from the address A'.

The transfer module 230 creates a conversion list based on the transfer list 224 and the transfer list 334. Specifically, the transfer module 230 identifies the address of the areas to store the assurance codes from the transfer list 334. The transfer module 230 associates the addresses of areas excluding the areas to store the assurance codes (namely, areas to store the read data for the read request on the memory 330) as the data transfer destination addresses with the addresses on the memory 220 of the server module 200 designated for storing temporarily the write data in the transfer list 224 as the data transfer source addresses. The conversion list in FIG. 10 associates the address of the 4096 bytes area starting from the address A' on the memory 330 as the data transfer destination address with the 4096 bytes area starting from the address A on the memory 220 as the data transfer source address. Further, the conversion list in FIG. 10 associates the address of the 4096 bytes area starting from the address A'+4160 bytes on the memory 330 as the data transfer destination address with the 4096 bytes area starting from the address B on the memory 220 as the data transfer source address.

The transfer module 230 controls the transfer of the data to be written for the write request from the memory 220 of the server module 200 to the memory 330 of the storage module 300 based on the created conversion list.

As described above, the conversion list allows the transfer module 230 to manage integrally the memory 220 and the memory 330. Therefore, the transfer module 230 is capable of controlling directly the data transfer between the memory 220 and the memory 330 without other processors. As the transfer module 230 controls directly the data transfer between the memory 220 and the memory 330 in this example, the overhead is inhibited and the high-speed data transfer between the memory 220 and the memory 330 is achieved in comparison with data transfer through plural processors (for example, the processor 320 of the storage module 300 and the processor 220 of the server module 200) or buffer memories of the processors in the data transfer.

It should be noted that the transfer module 230 is included in the server module 200 in Embodiment 1; however, this invention is not limited to this. For example, the transfer module 230 may be mounted on the backplane 400. That is to say, the transfer module 230 is not limited to its mounting location but is sufficient if the I/O bus of the server module 200 can be connected to the I/O bus of the storage module 300.

In Embodiment 1, two disk controllers 310 achieve redundancy of the storage controller 331 but this invention is not limited to this. For example, a single disk controller 310 may be logically divided to implement two storage controllers 331. In such a case, two I/Fs 360 are connected to the single disk controller.

As described above, in Embodiment 1, the transfer module 230 performs data transfer between the memory 220 of the server module 200 and the memory 330 of the storage module 300.

In data transfer in an existing computer system, protocol conversion is performed at the end point of the server module 200 and the end point of the storage module 300. In an example of traditional reading, the HBA 240 of the server module 200 converts the protocol in transferring a read request to the storage module 300 and the TBA 350 of the storage module 300 converts the protocol in transferring retrieved data.

In this invention, however, the server module 200 and the storage module 300 send commands whose protocols are not converted to the transfer module 230 and the transfer module 230 converts the protocols.

Specifically, the server module 200 sends server commands to the transfer module 230 as they are and the transfer module 230 converts the received server commands into storage commands to send the converted commands to the storage module 300. The storage module 300 sends storage commands to the transfer module 230 as they are; the transfer module 230 converts the received storage commands into server commands to send the converted commands to the server module 200.

Consequently, this invention has an effect of reducing the overhead in data transfer caused by protocol conversion.

Furthermore, since the transfer module 230 directly accesses the memory 220 of the server module 200 and the memory 330 of the storage module 300, this invention attains high-speed data transfer between memories via neither the processor 310 of the server module 200 nor the processor 320 of the storage module 300.

In Embodiment 1, the transfer module 230 is mounted in the server module 200 to achieve data transfer with high performance. That is to say, it is unnecessary to change the software configuration of the server module 200 or the hardware and software configuration of the storage module 300. Accordingly, the computer system in Embodiment 1 can be created at low cost.

The reason why the transfer module 230 in Embodiment 1 is mounted in the server module 200 is that, if the transfer module 230 is mounted in the storage module 300, every server module 200 needs a transfer module 230. In other words, the storage module 300 might be physically difficult to mount transfer modules 230 as many as the maximum number of connectable server modules 200.

Embodiment 2

Embodiment 1 provided a server apparatus 100 including server modules 200 and a storage module 300 within the same chassis; Embodiment 2 is different from Embodiment 1 in the point that the server modules 200 and the storage module 300 are in independent chassis. Hereinafter, Embodiment 2 is described mainly in differences from Embodiment 1.

Figure 7:
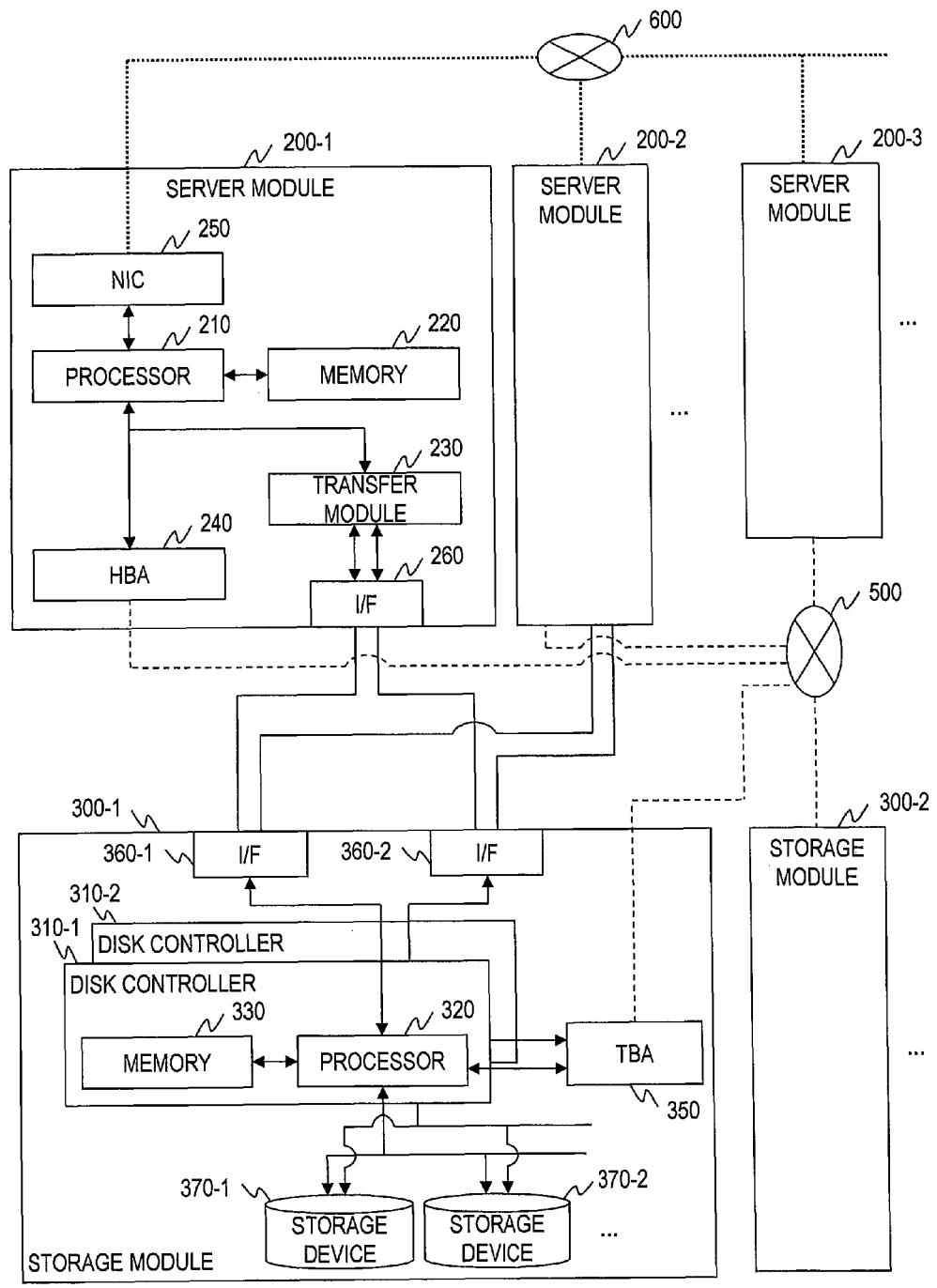
FIG. 7 is a block diagram illustrating a configuration example of a computer system in Embodiment 2 of this invention.

FIG. 7 is a block diagram illustrating a configuration example of a computer system in Embodiment 2 of this invention.

The computer system in Embodiment 2 is composed of a plurality of server modules 200 and a plurality of storage modules 300.

The hardware configuration and software configuration of the server module 200 and the storage module 300 are the same as those in Embodiment 1; accordingly, the explanation is omitted.

The server module 200-1 and the storage module 300-1 in Embodiment 2 are different from Embodiment 1 in the point that they are directly connected via connection lined such as metal cabled. Two connection lines are connected to the I/F 260 of the server module 200 and the other ends of the connection lines are connected to different I/Fs 360 of the storage module 300. Since the other connections are the same as those in Embodiment 1, the explanation is omitted.

The processing of the transfer module 230 in Embodiment 2 is the same as that shown in FIGS. 5 and 6 in Embodiment 1; accordingly, the explanation is omitted.

According to Embodiment 2, high-speed data transfer can be attained even though the server module 200 and the storage module 300 are in different chassis.

Embodiment 3

Embodiment 3 differs from Embodiment 1 in the points that the server modules 200 and the storage module 300 are in independent chassis and that each of them has a transfer module. Embodiment 3 is based on the assumption that the storage module 300 can mount transfer modules as many as the storage module 300 needs.

In the case where only the server module 200 has a transfer module 230, the storage module 300 manages the I/O bus from the disk controllers 310 to the transfer module 230 as the I/O connection area of the storage module 300.

For this reason, if a fault occurs in a connection line between a server module 200 and the storage module 300, the entire storage module 300 might go down because the storage module 300 recognizes the fault as a fault in the I/O connection area. Accordingly, the redundancy in the storage module 300 cannot function appropriately.

In view of the above, the storage module 300 in Embodiment 3 includes transfer modules 380. In this case, the storage module 300 manages the I/O bus from the disk controllers 310 to the transfer modules 380 of the storage module 300 for its own I/O connection area.

Hereinafter, Embodiment 3 is described mainly in differences from Embodiment 1.

Figure 8:
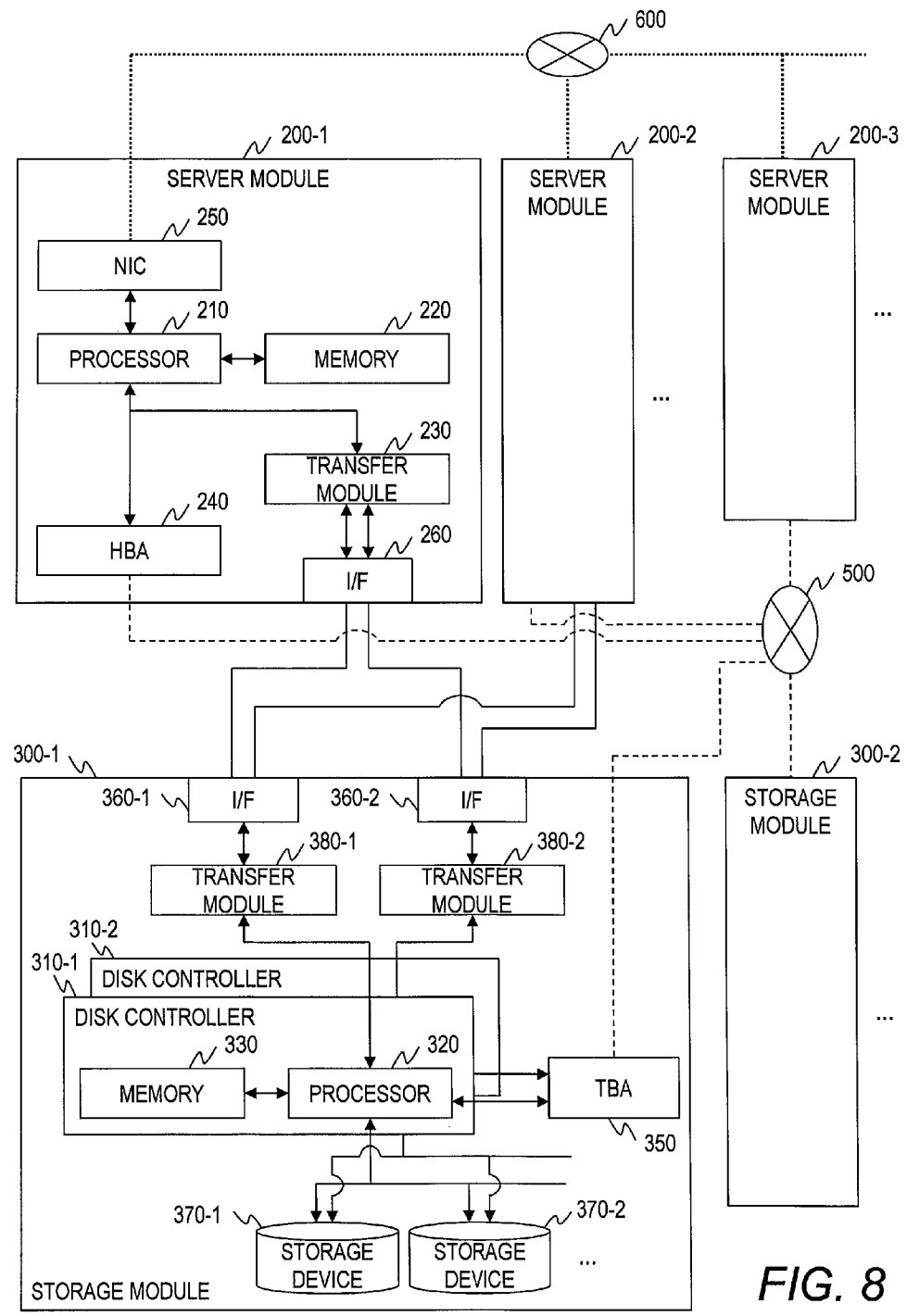
FIG. 8 is a block diagram illustrating a configuration example of a computer system in Embodiment 3 of this invention.

FIG. 8 is a block diagram illustrating a configuration example of a computer system in Embodiment 3 of this invention.

The computer system in Embodiment 3 is composed of a plurality of server modules 200 and a plurality of storage modules 300.

The hardware configuration and the software configuration of each server module 200 in Embodiment 3 is the same as those in Embodiment 1; the explanation is omitted.

Each storage module 300 in Embodiment 3 includes transfer modules 380-1 and 380-2. The transfer module 380-1 is connected to the disk controller 310-1 and the transfer module 380-2 is connected to the disk controller 310-2. The software configuration of the storage module 300 in Embodiment 3 is the same as that in Embodiment 1; the explanation is omitted.

The configuration of the transfer modules 380-1 and 380-2 is the same as that of the transfer module 230; the explanation is omitted.

In Embodiment 3, the transfer module 230 in the server module 200 functions as a bridge. That is to say, in the transfer module 230, data is transferred between connection ports 236 via the bridge 235 not via the data transfer unit 231. Accordingly, the server module 200 may have a common bridge instead of the transfer module 230.

In Embodiment 3, the transfer modules 380-1 and 380-1 of the storage module 300 perform the data transfer illustrated in FIGS. 5 and 6. The transfer modules 380-1 and 380-2 independently perform data transfer.

When a fault occurs in a connection line connecting a server module 200 and the storage module 300, the transfer module 380 changes the mode of the disk controller 310 connected from the transfer module 380 into a standby mode. This operation minimizes the range affected by the fault in the connection line.

For example, in the case of a fault in the connection line connecting the server module 200-1 and the disk controller 310-1, the transfer module 380-1 changes the disk controller 310-1 into a standby mode. Meanwhile, the transfer module 380-2 takes over the data transfer. Consequently, even if a fault occurs in a connection line connecting a server module 200 and the storage module 300, the other server modules 200 can be prevented from being affected by this fault.

In the case of a fault in the I/O bus in a server module 200, the following processing is performed. The root complex in the chipset (not-shown) of the server module 200 performs degeneration such as separating the failed I/O bus. The same processing is performed in the case of a fault in the I/O bus in a storage module 300.

To configure the transfer module 230 in the server module 200 as a bridge, the following method can be taken.

When the server module 200 is connected to the storage module 300 with a connection line, the OS 221 of the server module 200 inquires the storage module 300 whether the storage module 300 has a transfer module 380. If the OS 221 receives a response indicating that the storage module 300 has a transfer module 380, it configures its own transfer module 230 as a bridge.

Alternatively, the system administrator or a user may initially configure the transfer module 230 of the server module 200 as a bridge.

In the example shown in FIG. 8, the transfer modules 380 are connected to different I/Fs 360, but this invention is not limited to this. The number of transfer modules 380 may be one. In such a case, the single transfer module 380 is connected to the I/Fs 360-1 and 360-2 via different I/O buses. The transfer module 380 logically divides the functional units to perform I/O processing in parallel.

Embodiment 3 can increase the fault tolerance and achieve high-speed data transfer. It should be noted that Embodiment 1 can have the same configuration as Embodiment 3. That is to say, the storage module 300-1 may have a transfer module 380.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

Representative aspects of the present invention in addition to the aspects described in the claims are as follows:

1. A computer system comprising:
    a server module;
    a storage module; and
    a transfer module,
    the server module including a first processor, a first memory, a first interface for connecting the server module to other apparatuses, and a first connection line connecting the first processor, the first memory, and the first interface,
    the storage module including a controller including a second processor and a second memory, a storage device, a second interface for connecting the storage module to other apparatuses, and a second connection line connecting the controller, the storage device, and the second interface,
    the transfer module being connected to the first connection line and the second connection line,
    wherein the server module is configured to:
    create a first transfer list including an address and an address length to be used in storing data to be transferred to the first memory or retrieving the data to be transferred from the first memory; and
    send an I/O request for an I/O between the first memory and the second memory to the transfer module,
    wherein the storage module is configured to:
    receive the I/O request from the transfer module;
    create a second transfer list including an address and an address length to be used in storing the data to be transferred to the second memory or retrieving the data to be transferred from the second memory; and
    send a data transfer request to the transfer module,
    wherein the transfer module is configured to:
    acquire, upon receipt of the data transfer request from the storage module, the data to be transferred from the first memory or the second memory with reference to the first transfer list and the second transfer list; and transfer the acquired data to be transferred to the first memory or the second memory with reference to the first transfer list and the second transfer list.

2. A computer system according to the aspect 1,
wherein the transfer module is configured to:
in a case where the transfer module receives a first I/O request to retrieve data from the second memory to the first memory,
convert a command corresponding to the first I/O request into a command to be used in the storage module to send the converted command to the storage module;
acquire the data to be retrieved with reference to the second transfer list to convert the acquired data into data in a format to be handled by the server module by removing a data assurance code attached to the acquired data for checking integrity of the data;
determine a storage area in the first memory to write the converted data to be retrieved with reference to the first transfer list and the second transfer list, and write the converted data to be retrieved to the determined storage area in the first memory; and
notify the storage module of completion of data transfer, and
wherein the transfer module is configured to:
in a case where the transfer module receives a second I/O request to write data in the first memory to the second memory,
convert a command corresponding to the second I/O request into a command to be used in the storage module to send the converted command to the storage module;
acquire the data to be written with reference to the first transfer list to convert the acquired data into data in a format to be handled by the storage module by attaching a data assurance code;
determine a storage area in the second memory to write the converted data to be written with reference to the first transfer list and the second transfer list, and write the converted data to be written to the determined storage area in the second memory; and
notify the storage module of completion of data transfer.

3. A server module connected with a storage module including a controller including a first processor and a first memory, a storage device, a first interface for connecting the storage module to other apparatuses, and a first connection line connecting the controller, the storage device, and the first interface, the server module comprising:
a second processor;
a second memory;
a second interface for connecting the server module to other apparatuses;
a second connection line connecting the second processor, the second memory, and the second interface; and
a transfer module connected to the first connection line and the second connection line,
wherein the transfer module is configured to:
retrieve, upon receipt of an I/O request for an I/O between the first memory and the second memory from the second processor, a first transfer list from the first memory, the first transfer list being created by the first processor and including an address and an address length to be used in storing data to be transferred to the first memory or retrieving the data to be transferred from the first memory;
retrieve a second transfer list from the second memory, the second transfer list being created by the second processor and including an address and an address length to be used in storing data to be transferred to the second memory or retrieving the data to be transferred from the second memory;

acquire the data to be transferred from the first memory or the second memory with reference to the first transfer list and the second transfer list; and
transfer the acquired data to be transferred to the first memory or the second memory with reference to the first transfer list and the second transfer list.

4. A server module according to the aspect 3,
wherein the transfer module is configured to:
in a case where the transfer module receives a first I/O request to retrieve data from the first memory to the second memory,
convert a command corresponding to the first I/O request into a command to be used in the storage module to send the converted command to the storage module;
acquire the data to be retrieved with reference to the first transfer list to convert the acquired data into data in a format to be handled by the server module by removing a data assurance code attached to the acquired data for checking integrity of the data;
determine a storage area in the second memory to write the converted data to be retrieved with reference to the first transfer list and the second transfer list and write the converted data to be retrieved to the determined storage area in the second memory; and
notify the storage module of completion of data transfer, and
wherein the transfer module is configured to:
in a case where the transfer module receives a second I/O request to write data in the second memory to the first memory,
convert a command corresponding to the second I/O request into a command to be used in the storage module to send the converted command to the storage module;
acquire the data to be written with reference to the second transfer list to convert the acquired data into data in a format to be handled by the storage module by attaching a data assurance code;
determine a storage area in the first memory to write the converted data to be written with reference to the first transfer list and the second transfer list, and write the converted data to be written to the determined storage area in the first memory; and
notify the storage module of completion of data transfer.

5. A storage module connected with a server module including a first processor, a first memory, a first interface for connecting the server module to other apparatuses, and a first connection line connecting the first processor, the first memory, and the first interface, the storage module comprising:
a controller including a second processor and a second memory;
a storage device;
a second interface for connecting the storage module to other apparatuses;
a second connection line connecting the controller, the storage device, and the second interface; and
a transfer module connected to the first connection line and the second connection line,
wherein the transfer module is configured to:
retrieve, upon receipt of an I/O request for an I/O between the first memory and the second memory from the first processor, a first transfer list from the first memory, the first transfer list being created by the first processor and including an address and an address length to be used in storing data to be transferred to the first memory or retrieving the data to be transferred from the first memory;

retrieve a second transfer list from the second memory, the second transfer list being created by the second processor and including an address and an address length to be used in storing data to be transferred to the second memory or retrieving the data to be transferred from the second memory;

acquire the data to be transferred from the first memory or the second memory with reference to the first transfer list and the second transfer list; and transfer the acquired data to be transferred to the first memory or the second memory with reference to the first transfer list and the second transfer list.

6. A storage module according to the aspect 5, wherein the transfer module is configured to:

in a case where the transfer module receives a first I/O request to retrieve data from the second memory to the first memory, convert a command corresponding to the first I/O request into a command to be used in the storage module to send the converted command to the controller;

acquire the data to be retrieved with reference to the second transfer list to convert the acquired data into data in a format to be handled by the server module by removing a data assurance code attached to the acquired data for checking integrity of the data;

determine a storage area in the first memory to write the converted data to be retrieved with reference to the first transfer list and the second transfer list, and write the converted data to be retrieved to the determined storage area in the first memory; and notify the controller of completion of data transfer, and wherein the transfer module is configured to:

in a case where the transfer module receives a second I/O request to write data in the first memory to the second memory, convert a command corresponding to the second I/O request into a command to be used in the storage module to send the converted command to the controller;

acquire the data to be written with reference to the first transfer list to convert the acquired data into data in a format to be handled by the storage module by attaching a data assurance code;

determine a storage area in the second memory to write the converted data to be written with reference to the first transfer list and the second transfer list, and write the converted data to be written to the determined storage area in the second memory; and notify the controller of completion of data transfer.

What is claimed is:

1. A computer system comprising:

a server module, which includes a first processor and a first memory and which handles data on a first data format basis, and a storage module, which includes a second processor, a second memory, a storage device, and a transfer module and which handles data on a second data format basis, the second data format including a data assurance code, wherein, when the transfer module receives a read command from the first processor of the server module, the transfer module executes a DMA transfer from the second memory in the storage module to the first memory in the server module by:

reading a first data of the second data format, the first data including a particular data corresponding to the read command and a first data assurance code for the particular data, from the second memory of the storage module;

checking the particular data based on the first assurance code in the first data;

removing the first assurance code from the first data to convert the first data from the second data format to the first data format; and writing the converted first data to the first memory.

2. A computer system according to claim 1, wherein, in the case where the transfer module detects an error of the particular data in the first data based on the checking of the particular data, the transfer module notifies the second processor of the storage module of the error of the particular data.

3. A computer system according to claim 1, wherein the second processor of the storage module provides a plurality of logical units on the storage device to the server module.

4. A computer system according to claim 1, wherein the sever module, the storage module and the transfer module communicate with each other based on PCIe protocol.

5. A computer system comprising:

a server module, which includes a first processor and a first memory and which handles data on a first data format basis, and a storage module, which includes a second processor, a second memory, a storage device, and a transfer module and which handles data on a second data format basis, the second data format including a data assurance code, wherein, when the transfer module receives a write command from the first processor of the server module, the transfer module executes a DMA transfer from the first memory in the server module to the second memory in the storage module by:

reading a second data of the first data format, the second data including a particular data corresponding to the write command, from the first memory of the server module;

adding the data assurance code for the particular data to the second data to convert the second data from the first data format to the second data format; and writing the converted second data to the second memory.

6. A computer system according to claim 5, wherein the second processor of the storage module provides a plurality of logical units on the storage device to the server module.

7. A computer system according to claim 5, wherein the sever module, the storage module and the transfer module communicate with each other based on PCIe protocol.

8. A method for a computer system, wherein the computer system comprising:

a server module, which includes a first processor and a first memory and which handles data on a first data format basis, and a storage module, which includes a second processor, a second memory, a storage device, and a transfer module and which handles data on a second data format basis, the second data format including a data assurance code, the method comprising a step of:

(1) by the first processor of the server module, sending a read command;

(2) by the transfer module, receiving the read command; and (3) by the transfer module executing a DMA transfer from the second memory in the storage module to the first memory in the server module by:

(3a) reading a first data of the second data format, the first data including a particular data corresponding to the read command and a first data assurance code for the particular data, from the second memory of the storage module;

(3b) checking the particular data based on the first assurance code in the first data;

(3c) removing the first assurance code from the first data to convert the first data from the second data format to the first data format; and (3d) writing the converted first data to the first memory.

9. A method for a computer system according to claim 8, the method further comprising a step of:

(4) by the transfer module, detecting an error of the particular data in the first data based on the checking of the particular data; and (5) by the transfer module, notifying the second processor of the storage module of the error of the particular data.

10. A method for a computer system according to claim 8, the method further comprising a step of:

(6) by the second processor of the storage module, providing a plurality of logical units on the storage device to the server module.

11. A computer system according to claim 8, wherein the sever module, the storage module and the transfer module communicate with each other based on PCIe protocol.

12. A method for a computer system, wherein the computer system comprising:

a server module, which includes a first processor and a first memory and which handles data on a first data format basis, and a storage module, which includes a second processor, a second memory, a storage device, and a transfer module and which handles data on a second data format basis, the second data format including a data assurance code, the method comprising a step of:

(1) by the first processor of the server module, sending a write command;

(2) by the transfer module, receiving the write command; and (3) by the transfer module, executing a DMA transfer from the first memory in the server module to the second memory in the storage module by:

(3a) reading a second data of the first data format, the second data including a particular data corresponding to the write command, from the first memory of the server module;

(3b) adding the data assurance code for the particular data to the second data to convert the second data from the first data format to the second data format; and (3c) writing the converted second data to the second memory.

13. A method for a computer system according to claim 12, further comprising a step of:

(4) by the second processor of the storage module, providing a plurality of logical units on the storage device to the server module.

14. A computer system according to claim 12, wherein the sever module, the storage module and the transfer module communicate with each other based on PCIe protocol.

* * * * *